| United States Patent [19] | [11] Patent Number: 4,601,910 |
|---|---|
| Saub | [45] Date of Patent: Jul. 22, 1986 |

[54] SOYBEAN COOKING PROCESS

[76] Inventor: Jerry C. Saub, 2211 Ala Wai Blvd., Apt. #2410, Honolulu, Hi. 96815

[21] Appl. No.: 746,915

[22] Filed: Jun. 20, 1985

[51] Int. Cl.$^4$ .............................................. A23L 1/20
[52] U.S. Cl. ................................... 426/634; 426/482; 426/507
[58] Field of Search ................ 426/482, 634, 460, 507

[56] References Cited

U.S. PATENT DOCUMENTS

| 3,052,556 | 9/1962 | Baile | 99/186 |
|---|---|---|---|
| 3,594,184 | 7/1971 | Hawley et al. | 426/482 |
| 3,620,755 | 11/1971 | Hoffman | 99/17 |
| 3,627,537 | 12/1971 | Beck et al. | 99/98 |
| 4,117,174 | 9/1978 | Tonouchi et al. | 426/634 |
| 4,427,710 | 1/1984 | Terada et al. | 426/634 |
| 4,460,613 | 7/1984 | Yang et al. | 426/601 |

FOREIGN PATENT DOCUMENTS 2106624 8/1972 Fed. Rep. of Germany ...... 426/634

*Primary Examiner*—George Yeung
*Attorney, Agent, or Firm*—Townsend and Townsend

[57] ABSTRACT

Whole soybeans are processed by first soaking in an aqueous solution of a fruit juice selected from guava, papaya, pineapple, apple and orange, in a plastic vessel, followed by boiling in the same solution for at least about fifteen minutes, and finally draining off the solution and any loosened hulls. The fruit juice solution provides softening and palatability of the beans in an unusually short period of time. Added flavor and fragrance control may be achieved by a post-soak using any of a variety of fruit juices.

8 Claims, No Drawings

SOYBEAN COOKING PROCESS

BACKGROUND OF THE INVENTION

This invention relates to the processing of soybeans into palatable products, and particularly to a process for soaking and boiling soybeans to soften them to a crunchy state and yet impart an appealing flavor and/or fragrance to the final product in an unusually short time.

Despite its high nutritional value, its long history of use in the food preparations among Asian cultures, and the ease and low cost of its cultivation, the soybean has failed to gain widespread acceptance as a food product for human consumption. The difficulty lies in the tough skin of the bean which requires soaking for sixteen to twenty-four hours prior to cooking in order to produce a palatable product. In addition, the tough skin, unlike that of similar legumes, is particularly difficult to remove from the soybean.

To date, there are only two widely used methods for processing soybeans. The first involves the crushing of the bean followed by subsequent restructuring of the nutrient particles, as in the preparation of tofu, soy isolates, soy flour and soy powders. The second is the fermentation of the bean, as in the production of such products as tempeh, natto, miso, koji, shoyu and sufu. Each of these processes is costly and time consuming and completely changes the nature of the bean.

SUMMARY OF THE INVENTION

It has now been discovered that whole soy beans may be rendered palatable and highly pleasing as a food product with sharply reduced soaking and cooking times by the inclusion of certain selected fruit juice additives in the water during the soaking and cooking stages. Test results covering a wide range of fruit juices have confirmed the unusual nature of the juices claimed herein in terms of their effect on the cooking process. It has further been discovered that parameters such as texture, flavor and fragrance can be controlled by the proper selection and combination of fruit juice additives and by the soaking of the beans subsequent to the cooking, extending the present invention to a wide range of utility in terms of the ultimate use of the product in recipes of various kinds. The overall treatment time may be reduced to a few hours or, if light taste in fragrance is acceptable, to substantially less than an hour.

DETAILED DESCRIPTION OF THE INVENTION AND PREFERRED EMBODIMENTS

According to the process of the invention, soybeans are soaked whole in an aqueous solution of a selected fruit juice until the soybeans are substantially softened, then boiled in the same solution for at least about fifteen minutes to loosen the hulls of the beans. Finally, the soybeans are recovered from the solution substantially free of hulls, rinsed and drained. Additional flavor and fragrance control may then be imparted to the soybeans by soaking in a second aqueous solution of a selected fruit juice for sufficient time to achieve the desired effect.

The aqueous solution used in the initial soak (further referred to herein as the "pre-soak") and boiling stages of the process is the juice of one or more fruits selected from guava, papaya, pineapple, apple and orange. It has been found that each of these fruits has a beneficial effect in producing a palatable product, unlike other fruits tested. The individual fruits vary in their effect on the final texture. Guava, for instance, produces a firm, slightly rubbery texture, much like cashews, whereas papaya produces a slightly grainy or sandy texture. Combining these in appropriate proportions will result in control of the texture between these two characteristics. Similar control may be achieved by other combinations among these five fruits. Preferred fruits are guava, papaya, and pineapple, with guava being the most preferred.

A further critical feature of the pre-soak step is that it be done in a plastic vessel. Surprisingly, it has been found that the beneficial results sought by this invention are indeed achieved when a plastic vessel is used, and are not achieved when metallic vessels, as one might normally use in view of the subsequent boiling step, are used. Accordingly, a plastic or plastic-lined vessel should be used. Any conventional plastic used in containing, storing or cooking foods will be suitable. Examples include polyurethanes, acrylics, polyethylene and polypropylene.

The concentration of the fruit juice in the aqueous solution of the pre-soak stage is not critical and may vary widely. In most applications, a concentration ranging from about 1.0% to about 20% by volume, preferably about 5% to about 10% by volume, will provide the best results.

The temperature of the aqueous solution and the duration of the pre-soak are not critical and may vary, provided that the result is a substantial softening of the soybeans prior to the boiling stage. In general, pre-soak temperatures ranging from about room temperature to about 170° F. (77° C.), and a duration ranging from about eight minutes to about five hours are preferred. Shorter soak times will suffice when higher temperatures are used. It is particularly preferred to operate at approximately room temperature for at least about three hours. Room temperature is intended herein to mean temperatures typically within the range of about 68°–80° F. (20°–27° C.).

The boiling stage may be conducted in a metallic vessel for a period of time sufficient to cook the beans and loosen their hulls. This will generally be at least about fifteen minutes, preferably at least about 25 minutes. The cooked beans are then drained and rinsed with fresh water, preferably at least twice, to remove excess fruit juice and any loose hulls. The temperature of the water may vary, although room temperature or below are acceptable.

Depending on the ultimate use of the bean as part of a food preparation or recipe, it may then be desirable to add a further soaking step (referred to herein as the "post-soak"). This is done in an aqueous solution of a fruit juice, preferably at a concentration of about 10% to about 20% by volume. The selection of the fruit juice will depend on the ultimately desired taste, fragrance or both. Typical examples include pineapple, apple, orange, peach, pear and apricot. The duration of the post-soak may also vary, depending on the desired results. In most cases, the post-soak of about three minutes to about thirty minutes will provide adequate results. The temperature of the post-soak solution may also vary, and will affect the rate at which the flavor and/or fragrance are imparted to the beans. In most cases, however, a temperature ranging from about 68° F. (20°

C.) to about 150° F. (66° C.) will provide the best results.

The process of the present invention is applicable to dried mature soybeans of a wide range of varieties, including both yellow-skinned and black-skinned varieties. Yellow-skinned varieties are preferred.

The following examples are offered for purposes of illustration, and are intended neither to define nor limit the invention in any manner.

EXAMPLE 1

A polyethylene storage jar (Rubbermaid, Inc., Wooster, Ohio) was charged with 50 ml of dried yellow soybeans and 250 ml of water combined with 15 ml of a selected fruit juice (indicated below). The soybeans were soaked thus for 2.5 to 3.5 hours at a temperature of approximately 77° F.

The mixture was then transferred to a stainless steel pot in which it was heated to a boil at atmospheric pressure for about 25 minutes. The pot was then removed from the heat and the soybeans removed by a strainer. The soybeans were then rinsed by immersion in cold water and agitated slightly to loosen the hulls. The water and detached hulls were then drained off and the soybeans were rinsed and drained a second time. The texture and taste were then determined. The results are listed in Table I below.

TABLE I
TEST RESULTS - PRE-SOAK AND BOILING ADDITIVES

| Fruit Juice Additive | Soak Duration | Result |
|---|---|---|
| 1. Guava | 3.5 hours | Pliable, rubbery texture; excellent taste. |
| 2. Papaya | 3.5 hours | Slightly sandy texture; very good taste. |
| 3. Pineapple | 3.5 hours | Slightly gritty texture; very good taste. |
| 4. Apple | 3.5 hours | Cashew-like texture; very good taste. |
| 5. Orange | 3.5 hours | Very good texture and taste, accenting nut flavor. |
| 6. V-8 | 3.5 hours | Very good texture; taste slightly tangy but not bitter. |
| 7. Prune | 3 hours | Hull removal difficult; bean too soft. |
| 8. Peach | 3 hours | Hull removal difficult; bean too soft. |
| 9. Pear | 3 hours | Hull removal difficult; bean too soft. |
| 10. Pomegranate | 2.5 hours | Unpleasant texture and taste. |
| 11. Apricot | 2.5 hours | Unpleasant texture; taste marginal. |
| 12. Black Cherry | 2.5 hours | Unpleasant texture and taste. |

The guava and papaya juices were labeled "Mission San Juan" guava and papaya nectar, respectively, products of A.F. Foods, Santa Ana, Calif. The pineapple juice was Dole brand pineapple juice, a product of Castle and Cooke, Honolulu, Hawaii. The apple juice was "Apple Time" unfiltered apple juice, a product of Apple Time, Co., Sebastopol, Calif. The orange juice was reconstituted from "Minute Maid" frozen orange juice concentrate, a product of Coca Cola Company, Houston, Tex. "V-8" refers to "V-8 Cocktail Vegetable Juice," a product of Campbell Soup Co., Camden, N.J. The prune juice was Westbrae Natural Prime Juice of Westbrae Natural Foods, Berkeley, Calif. The peach, pear, pomegranate, apricot and black cherry juices were products of Heinke's Inc., Paradise, Calif.

EXAMPLE 2

The procedure of Example 1 was followed with the addition of a further step following the draining of the rinsed soybeans. This further step was a soaking of the soybeans in water containing 3–4 tablespoons (per cup of water) of a selected fruit juice at room temperature for about thirty minutes. The beans were then drained once again. The following table lists indications of the resulting smell of the beans, using the index 1 to designate little or no noticeable change in smell, 2 to designate a moderate change, and 3 to designate a large change.

TABLE II
TEST RESULTS - SMELL ALTERATION BY POST-SOAK

| POST-SOAK ADDITIVE: | PRE-SOAK AND COOK ADDITIVE: | | | | |
|---|---|---|---|---|---|
| | Guava | Pineapple | Apple | Orange | V-8 |
| Guava | 2 | 1 | 3 | 1 | 1 |
| Pineapple | 3 | 3 | 3 | 3 | 3 |
| Apple | 3 | 2 | 2 | 3 | 2 |
| Orange | 3 | 3 | 3 | 3 | 2 |
| V-8 | 2 | 2 | 2 | 2 | 2 |
| Prune | 1 | 1 | 1 | 2 | 2 |
| Peach | 3 | 3 | 3 | 3 | 3 |
| Pear | 3 | 2 | 3 | 3 | 1 |
| Pomegranate | 1 | 1 | 1 | 1 | 1 |
| Apricot | 3 | 3 | 3 | 3 | 1 |
| Black Cherry | 1 | 1 | 1 | 1 | 1 |

The results in the table indicate that pineapple, orange and peach are the most effective in altering the smell at the pre-soak stage, while prune, pomegranate and black cherry are the least effective.

EXAMPLE 3

The procedure of Example 1 was followed, using papaya as the fruit juice additive, except for the following differences: the pre-soak solution was at 170° F., the pre-soak duration was only eight minutes, and the boiling step duration was only seventeen minutes. Following the draining of the soybeans, they were rinsed in 125° F. water for about three minutes.

The result was a product of crunchy, edible consistency, with a pleasing taste and smell, and with about 50% to about 60% of the fragrance strength of the corresponding product of Example 1.

EXAMPLE 4

This example illustrates the unusual efficacy obtained by the use of a plastic container for the presoak stage.

The procedure of Example 1 was followed, using papaya as the fruit juice additive. An aluminum pot, however, was substituted for the plastic storage container in the pre-soak stage of the process. The boiling was then done in the same pot. The soybeans failed to change texture during the process, retaining instead their original hard texture.

The foregoing is offered primarily for purposes of illustration. It will be readily apparent to those skilled in the art that numerous variations and modifications from the procedures and materials disclosed herein can be substituted without departing from the spirit and scope of the invention, as claimed hereinbelow.

What is claimed is:

1. A process for cooking soybeans, comprising:

(a) soaking said soybeans whole with hulls intact in a first aqueous solution of the juice of at least one fruit selected from the group consisting of guava, papaya, pineapple, apple and orange, in a plastic vessel, to substantially soften said soybeans, the concentration of said juice in said first aqueous solution ranging from about 1% to about 20% by volume;

(b) boiling said first aqueous solution with said soybeans soaking therein for at least about fifteen minutes until the hulls are subsequently loosened from said soybeans;

(c) recovering said soybeans from said first aqueous solution substantially free of hulls; and (d) soaking said recovered soybeans substantially free of hulls in a second aqueous solution of the juice of a fruit selected from pineapple, apple, orange, peach, pear and apricot, the concentration of said juice in said second aqueous solution ranging from about 10% to about 20% by volume.

2. A process according to claim 1 in which the temperature of said first aqueous solution is from about 68° F. to about 170° F., and step (a) is continued for about eight minutes to about five hours.

3. A process according to claim 1 in which the temperature of said first aqueous solution is approximately room temperature, and step (a) is continued for at least about three hours.

4. A process according to claim 1 in which the concentration of said juice in said first aqueous solution is about 5% to about 10% by volume.

5. A process according to claim 1 in which step (b) is continued for at least about 25 minutes.

6. A process according to claim 1 in which the fruit of step (a) is selected from the group consisting of guava, papaya and pineapple.

7. A process according to claim 1 in which the fruit of step (a) is guava.

8. A process for cooking soybeans, comprising:

(a) soaking said soybeans whole with hulls intact in a first aqueous solution of the juice of at least one fruit selected from the group consisting of guava, papaya and pineapple at a concentration of about 5% to about 10% by volume, at approximately room temperature, in a plastic vessel for at least about three hours;

(b) boiling said first aqueous solution with said soybeans soaking therein for at least about 25 minutes;

(c) recovering said soybeans from said first aqueous solution substantially free of hulls; and (d) soaking said recovered soybeans substantially free of hulls in a second aqueous solution of the juice of at least one fruit selected from the group consisting of pineapple, apple, orange, peach, pear and apricot juices at a concentration of about 10% to about 20% by volume, at approximately room temperature, to substantially impart the flavor of said fruit to said soybeans.

* * * * *

UNITED STATES PATENT AND TRADEMARK OFFICE
CERTIFICATE OF CORRECTION

PATENT NO. : 4,601,910

DATED : Jul. 22, 1986

INVENTOR(S) : Jerry C. Saub

It is certified that error appears in the above-identified patent and that said Letters Patent is hereby corrected as shown below:

Column 4, line 34: change "pre-soak" to ---post-soak---;

Column 4, line 38: change "Example 1" to ---Example 2---;

Column 4, line 49: change "Example 1" to ---Example 2---.

Signed and Sealed this

Tenth Day of March, 1987

Attest:

DONALD J. QUIGG

*Attesting Officer*   *Commissioner of Patents and Trademarks*